:::
2,897,231
METHOD FOR THE RECOVERY OF AZELAIC ACID FROM A MIXTURE OF OXIDIZED ACIDS

Sigismund J. Niegowski, Philadelphia, and Allison Maggiolo, Merion, Pa., assignors to The Welsbach Corporation, Philadelphia, Pa., a corporation of Delaware No Drawing. Application June 2, 1958
Serial No. 739,007

5 Claims. (Cl. 260—485)
:::

This invention relates to processes which make azelaic acid from unsaturated fatty acids such as oleic and linoleic acid and mixtures thereof by oxidation with ozone.

The fundamentals of the addition of ozone to a carbon-carbon double bond, the cleavage of this ozonized intermediate and the oxidation of the cleaved compounds to give certain carboxylic acids are well known in the art and have been discussed in great detail in Molinari, Ber. 39, p. 2737 (1906), and Long, Chem. Reviews 27, p. 452 (1940), and Harries, Ber. 39, pp. 2844–46.

The quantitative reaction of ozone with a carbon-carbon double bond has been confirmed in practice of the known processes and in a classical procedure by Boer and Kooyman, Anal. Chim. Acta 5, p. 550 (1951).

After the addition of ozone, the subsequent steps of the process consist of cleavage of the ozonized intermediate followed by oxidation of the cleaved compounds to carboxylic acids. The cleavage mechanism is mentioned in the article by Long (above) and also discussed by Asinger, Ber. 75, pp. 656–660 (1942), and Rieche, Ann., vol. 553, pp. 187–249 (1942). In general it can be shown that the optimum conditions for the scission of the ozonized intermediates are dependent on solvent, temperature, water content and possibly the presence of some catalytic material.

In the oxidation of the cleaved products to obtain acids, Mottier, Helv. Chim. Acta 14, pp. 1080–90 (1931), has shown that the completeness of reaction is dependent on the presence of oxygen. This oxygen is obtained from air, gaseous oxygen or other known oxidants. The parameters of this have been investigated many times and it is concluded that optimum conditions may be established for each particular case.

It has been shown that the addition of ozone to the double bond is quantitative. The cleavage of the ozonized intermediate can be expected to give nearly all of the available scission products for subsequent oxidation to acids. However, after oxidation an amount of azelaic acid considerably less than theoretically expected can be found in the mixed acids. The first consideration of any process is that a maximum amount of the normally expected products be recovered. In the case of azelaic acid from pure oleic acid, yields in the range of 65 to 80% of the theoretically obtainable acid have been reported. Similar results are expected in the cases of other unsaturated fatty acids which can give azelaic acid.

Other pertinent references which describe typical processes for making azelaic acid using ozone are German Patent 565,158, issued November 26, 1932; U.S. Patent 2,813,113, issued November 12, 1957; and the pending allowed U.S. application of Allison Maggiolo, Serial No. 569,673, filed March 6, 1956.

In these known processes, well known methods are employed for the recovery of the product acids. For example, the mixture of acids may be distilled. The different products are separated according to their boiling point ranges. In another method, some of the acids which are lower boiling than azelaic acid may be removed from the mixture first and the higher boiling dibasic acids (essentially azelaic acid) may be extracted with water. In this case the separation is effected as a function of relative solubility. Still another method similar to the extraction just described employs two immiscible solvents such as a water phase and an organic phase, so arranged that essentially all of the azelaic would be soluble in the water, while the other acids (essentially monobasics) would be soluble in the organic phase.

Most unexpectedly we have found that when oleic and linoleic acids are ozonized, the ozonized intermediate cleaved, and the cleaved products oxidized to acids, apparently some compound related to azelaic acid hereinafter referred to as a "precursor" is formed which prevents the complete recovery of azelaic acid.

The novel process of the present invention provides a method for obtaining from this precursor its constitutent azelaic acid content by esterifying the mixed oxidate acids and subsequent distillation of the esters to obtain a maximum yield of azelaic acid. Esterification of the mixed acids may be accomplished by known procedures which include treatment with di-methyl sulfite or methylene chloride-methyl alcohol and a strong acid such as sulfuric acid.

In another process of the present concept the mixed oxidate acids may be treated directly with a strong mineral acid such as sulfuric, nitric, hydrochloric or phosphoric acid at reflux temperatures to convert the precursor into its constituent azelaic acid. Here the azelaic acid is recovered directly from the mixture of acids while in the first method described above the azelaic acid is recovered as an ester.

In another process according to the present concept the mixed acids are separated by extraction in two immiscible solvents with azelaic acid obtained from the water phase and the other acids obtained from the organic phase. The residue from the organic phase may then be treated either by esterification or directly by strong mineral acids, each as described above.

The utility of azelaic acid is too well known to require detailed discussion. Among its known uses are as a plasticizer, as a lubricant, and in the production of polymers as generally referred to in U.S. Patent 2,813,113 of November 12, 1957.

An object of this invention is therefore to provide a method which treats mixed oxidate acids to obtain maximum recovery of azelaic acid.

Another object of this invention is to provide a method which treats mixed oxidate acids to improve substantially the yield of azelaic acid over that obtainable by known methods.

Another object of this invention is to provide a method for the production of azelaic acid by conversion of the intermediate precursor, which would otherwise prevent the complete recovery of azelaic acid from the mixed oxidate acids, to obtain its constituent azelaic acid content.

As an example of the present invention, 50.0 g. of pure oleic acid together with 50 g. of a suitable inert solvent were treated with 9.4 g. of ozone at 25° C., and the ozonized mixture was cleaved and oxidized by the addition of 11.0 g. of water and the addition of gaseous oxygen at a temperature of 102° C. The final mixed oxidate comprising essentially azelaic and pelargonic acids were analysed and found to contain 26.7 g. of azelaic acid or 80% of theory. An aliquot portion of the mixed oxidate acids was treated with di-methyl sulfite to form the esters of the corresponding acids. The analysis of the esters showed that 31.0 g. of azelaic acid was now obtainable from the original oxidate, or 93% of theory.

In another example of the present invention 50.0 g. of mixed oxidate acids which contained 10.25 g. of azelaic acid by analysis were treated with di-methyl sulfite to form the esters of the corresponding acids. The analysis of the esters showed that 12.00 g. of azelaic acid were now obtainable from the mixed oxidate.

In another example of the present invention, a mixed oxidate similar to the one described in Example 1 was treated with methylene chloride, methyl alcohol and an acid catalyst to form the esters of the mixed acids. Similar improved yields of azelaic acid were obtained as described above for the di-methyl sulfite esterification method.

In this example 50.0 g. of mixed oxidate acids containing 10.25 g. of azelaic acid were treated with methylene chloride to form the esters of the corresponding acids. The analysis of the esters showed that 11.90 g. of azelaic acid were now obtainable from the mixed oxidate.

In another example of the present invention 50.0 g. of mixed oxidate acids, which was shown by analysis to contain 18.1% of azelaic acid or 9.06 g., were treated at reflux temperature for 4 hours by the addition of 5 ml. of 10% sulfuric acid. The final oxidate was analysed and contained 10.25 g. of azelaic acid.

In another example 50.0 g. mixed oxidate acids containing 9.25 g. of azelaic acid were treated at reflux temperature for 4 hours by the addition of 5 ml. of 10% phosphoric acid. The final oxidate was analysed and contained 9.46 g. of azelaic acid.

In another example 50.0 g. of mixed oxidate acids containing 7.92 g. of azelaic acid were treated at reflux temperature for 2 hours by the addition of 20 ml. of 0.25% nitric acid. The final oxidate was analysed and contained 8.48 g. of azelaic acid.

In another example 50.0 g. of mixed oxidate acids containing 7.92 g. of azelaic acid were treated at reflux temperature for 2 hours by the addition of 20 ml. of 0.25% hydrochloric acid. The final oxidate was analysed and contained 8.66 g. of azelaic acid.

In still another example of the present invention, 70.75 pounds of distilled tall oil fatty acids containing essentially oleic and linoleic acids, were treated with 13.75 pounds of ozone in an equal amount of a suitable solvent and subsequently cleaved and oxidized with gaseous oxygen to give 156.2 pounds of mixed oxidate acids. These mixed acids were cooled and 75.0 pounds of clear supernatant liquid were recovered with contained 6.21 pounds of azelaic acid dissolved therein. The remainder of the mixed acids, 73.9 pounds, was extracted by countercurrently mixing with water and an immiscible organic solvent. The organic solvent was separated from the other acids by distillation, and the residue acids, those which boiled higher than pelargonic acid, were found to contain 2.03 pounds of azelaic acid. An aliquot portion of these residue acids from the organic phase was esterified with di-methyl sulfite. An analysis of the esters showed that 6.85 pounds of the azelaic acid were present in the original residue.

The azelaic acid was allowed to crystallize from the water phase, and after filtration and drying weighed 15.21 pounds. The azelaic acid in the water filtrate was calculated as 0.88 pound from its aqueous solubility. The azelaic acid recovered without esterification of residue acids was 24.33 pounds. The additional azelaic acid recovered from the esterified residue acids was 4.82 pounds or a total azelaic acid yield 29.15 pounds.

From the examples given above it is now apparent that the methods of the present invention provide an unexpected increase in yield of azelaic acid on the order of from 4 to 20%.

In the treatment of the mixed oxidate acids to form the esters in normal commercial procedures the particular esters will be separated and recovered by fractional distillation. Any accepted method for the conversion of acids to esters is applicable. In large scale operation the use of methyl alcohol and sulfuric acid is preferred.

In the treatment of the mixed oxidate acids to recover essentially monobasic acids and dibasic acids by simple fractional distillation the precursor, which prevents the complete recovery of azelaic acid from the mixed acids, has a higher boiling point than azelaic acid. Therefore additional recovery of azelaic acid can be effected by esterification or acid treatment of that portion of the still fraction.

Various theories may be advanced as to the cause of the formation of the intermediate precursor which prevents maximum recovery of available azelaic acid from the mixed oxidate acids. Similarly, various theories may be advanced as to how the methods described in this invention convert this intermediate precursor to azelaic acid. None of these theories can be proved and discussion of them will be omitted so as not to burden unduly this specification.

The methods of the present invention are capable of various procedural embodiments and the illustrative description contained in the specification and examples should in no way be construed as defining or limiting the present invention, reference being had to the appended claims to determine its scope.

What is claimed is:

1. In a method for recovering azelaic acid from a mixture of oxidized acids produced by the ozonization of unsaturated fatty acids selected from the group consisting of oleic acid, linoleic acid and mixtures thereof, cleavage and subsequent oxidation to carboxylic acids, the step of esterifying the mixed oxidized acids to increase substantially the yield of the ester of azelaic acid and then recovering the ester of azelaic acid by fractional distillation.

2. In a method for recovering azelaic acid from a mixture of oxidized acids produced by the ozonization of unsaturated fatty acids selected from the group consisting of oleic acid, linoleic acid and mixtures thereof, cleavage and subsequent oxidation to carboxylic acids, the step of adding to the mixed oxidized acids under reflux conditions a mineral acid selected from the group consisting of sulfuric, hydrochloric, nitric and phosphoric to increase substantially the yield of azelaic acid and then recovering the azelaic acid from the mixed acids.

3. In a method for recovering azelaic acid from a mixture of oxidized acids produced by the ozonization of unsaturated fatty acids selected from the group consisting of oleic acid, linoleic acid and mixtures thereof, cleavage, subsequent oxidation to carboxylic acids, and extraction of the mixed oxidized acids in water and an organic solvent wherein the dibasic acids are dissolved in the water phase and the monobasic acids are dissolved in the organic phase and recovery of the monobasic acids from the organic phase by distillation leaving residue acids, the step of esterifying the residue acids to increase substantially the yield of the ester of azelaic acid and then recovering the ester of azelaic acid by fractional distillation.

4. In a method for recovering azelaic acid from a mixture of oxidized acids produced by the ozonization of unsaturated fatty acids selected from the group consisting of oleic acid, linoleic acid and mixtures thereof, cleavage, subsequent oxidation to carboxylic acids, and extraction of the mixed oxidized acids in water and an organic solvent wherein the dibasic acids are dissolved in the water phase and the monobasic acids are dissolved in the organic phase and recovery of the monobasic acids from the organic phase by distillation leaving residue acids, the step of adding to the residue acids under reflux conditions a mineral acid selected from the group consisting of sulfuric, hydrochloric, nitric and phosphoric acids to increase substantially the yield of azelaic acid and then recovering azelaic acid from the residue acids.

5. In a method for recovering azelaic acid from a mixture of oxidized acids produced by the ozonization of unsaturated fatty acids selected from the group consisting of oleic acid, linoleic acid and mixtures thereof, cleavage, subsequent oxidation to carboxylic acids, and distillation of the mixed acids to obtain azelaic acid and residue acids which are higher boiling than azelaic acid, the step of esterifying the residue acids to increase substantially the yield of the ester of azelaic acid and then recovering the ester of azelaic acid from the esterified residue acids by fractional distillation.

No references cited.